United States Patent
Wang

(10) Patent No.: US 9,646,336 B2
(45) Date of Patent: May 9, 2017

(54) INFORMATION PROCESSING SYSTEM AND INFORMATION PROCESSING METHOD

(71) Applicant: Weibo Wang, Kanagawa (JP)

(72) Inventor: Weibo Wang, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 558 days.

(21) Appl. No.: 14/197,311

(22) Filed: Mar. 5, 2014

(65) Prior Publication Data

US 2014/0279264 A1    Sep. 18, 2014

(30) Foreign Application Priority Data

Mar. 12, 2013 (JP) .................... 2013-049215
Nov. 13, 2013 (JP) .................... 2013-234744

(51) Int. Cl.
 G06Q 30/06    (2012.01)
 G06Q 10/08    (2012.01)

(52) U.S. Cl.
 CPC ..... *G06Q 30/0627* (2013.01); *G06Q 10/0875* (2013.01)

(58) Field of Classification Search
 None
 See application file for complete search history.

(56) References Cited

U.S. PATENT DOCUMENTS

2010/0100411 A1    4/2010  Sawaguchi
2010/0312600 A1*  12/2010  Motoyama ............ G06F 3/1218
                                                                705/7.35

FOREIGN PATENT DOCUMENTS

JP    2010-097391    4/2010

OTHER PUBLICATIONS

Extended European Search Report dated Dec. 3, 2015.

* cited by examiner

*Primary Examiner* — Shay S Glass
(74) *Attorney, Agent, or Firm* — IPUSA, PLLC

(57) ABSTRACT

An information processing system constituted with one or more computers includes a first result storage part to store result values of operation amounts of a first device; a prediction part to generate prediction values of operation amounts of the first device during a period; a calculation part to calculate indicator values based on the prediction values; an extraction part to select a second device that substitutes the first device using the indicator values; a replacement information storage part to store correspondence information between a device before replacement and a device after replacement; an obtainment part to obtain operation amounts of the devices before and after replacement, respectively, assuming that the first device is replaced by the second device; and an output part to output information about the obtained operation amounts.

14 Claims, 12 Drawing Sheets

FIG.6

| MODEL | FUNCTION | FULL COLOR | MONO | CHARGE /HOUR |
|---|---|---|---|---|
| Type-1MFP | Print | 5 | 1 | null |
| Type-1MFP | Copy | 5 | 1 | null |
| Type-1MFP | Fax | 3 | 0.6 | null |
| Type-1MFP | Scan | 2 | 0.5 | null |
| : | : | : | : | : |
| Type-2MFP | ... | ... | ... | ... |
| : | : | : | : | : |
| Type-20LP | Print | 4 | 0.8 | null |
| : | : | : | : | : |
| Type-3Projector | Display | null | null | 0.1 |
| : | : | : | : | : |
| Smart Phone | Display | null | null | 0.2 |
| PC | Display | null | null | 0.3 |

FIG.7

| MODEL | FUNCTION | PERFORMANCE INFO STORAGE PART | SUBSTITUTE FUNCTION | SUBSTITUTE PERFORMANCE CONVERSION FORMULA |
|---|---|---|---|---|
| Type-1MFP | Print | ... | Display | ... |
| Type-1MFP | Copy | ... | | |
| Type-1MFP | Fax | ... | | |
| Type-1MFP | Scan | ... | | |
| .. | .. | ... | | |
| Type-2MFP | .. | ... | | |
| Type-20LP | Print | ... | Display | ... |
| Type-3Projector | Display | ... | | |
| .. | .. | ... | | |
| Smart Phone | Display | ... | | |
| PC | Display | ... | | |

| REFERENCE INDICATOR | MODEL BEFORE REPLACEMENT | DEVICE ID BEFORE REPLACEMENT | MODEL AFTER REPLACEMENT | DEVICE ID AFTER REPLACEMENT | REPLACEMENT DATE | CUSTOMER ID | PREDICTION PERIOD |
|---|---|---|---|---|---|---|---|
| COST | Type-1MFP | ABC123 | Projector | XYZ123 | 2009/11/2 | S56020013F2 | 12 MONTHS |
| COST | Type-1MFP | ABC789 | Type-20LP | EFG123 | 2009/11/2 | V7899000037 | 12 MONTHS |
| COST | Type-2MFP | BCD123 | Type-10MFP | HIJ123 | 2010/1/20 | 5092-000031 | 24 MONTHS |
| Co2 | Type-3MFP | CDE123 | Type-25LP | JKL123 | 2010/1/21 | BPB00000002 | 12 MONTHS |

213

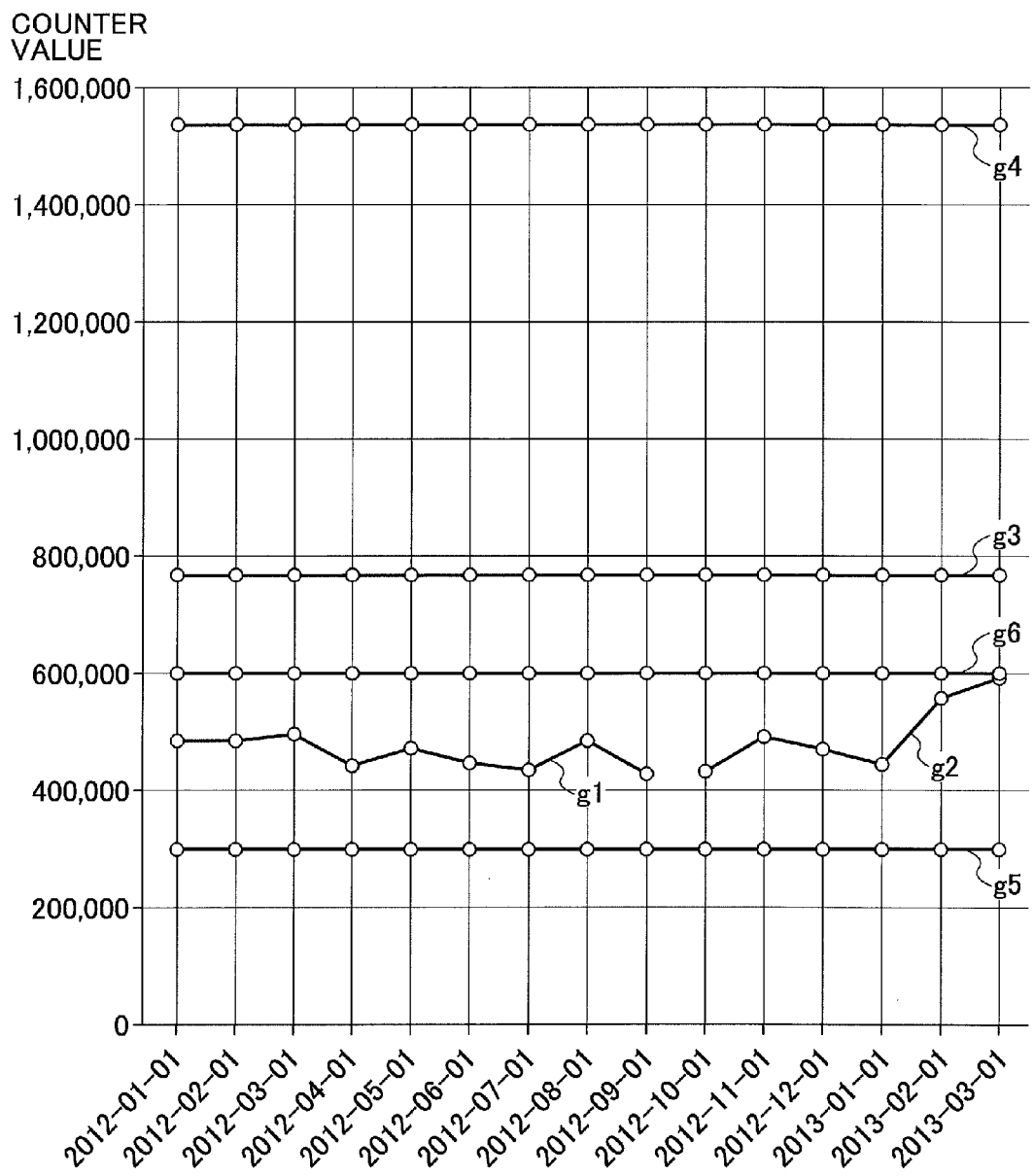

INFORMATION PROCESSING SYSTEM AND INFORMATION PROCESSING METHOD

BACKGROUND OF THE INVENTION

1. Field of the Invention

The disclosures herein generally relate to an information processing system and an information processing method.

2. Description of the Related Art

Conventionally, comparison data that compares a device used in an office or the like with other devices in terms of cost, power consumption and the like has been used as effective data for proposing replacement of the device.

For example, by showing that the same function as used conventionally can be implemented with a lower cost or lower power consumption, it is possible to demonstrate the benefit to a customer that may be obtained by replacing the device.

RELATED-ART DOCUMENTS

Patent Documents

[Patent Document 1] Japanese Laid-open Patent Publication No. 2010-097391

SUMMARY OF THE INVENTION

In view of the above, it is an object of the present invention to raise accuracy of proposal information for replacement of a device.

According to at least an embodiment of the present invention, an information processing system constituted with one or more computers includes a first result storage part to store result values of operation amounts of a first device; a prediction part to generate prediction values of operation amounts of the first device during a period; a calculation part to calculate indicator values based on the prediction values; an extraction part to select a second device that substitutes the first device using the indicator values; a replacement information storage part to store correspondence information between a device before replacement and a device after replacement; an obtainment part to obtain operation amounts of the devices before and after replacement, respectively, assuming that the first device is replaced by the second device; and an output part to output information about the obtained operation amounts.

According to at least an embodiment of the present invention, it is possible to raise accuracy of proposal information for replacement of a device.

BRIEF DESCRIPTION OF DRAWINGS

FIG. 6 is a schematic view illustrating an example of a configuration of a unit charge information storage part;

FIG. 7 is a schematic view illustrating an example of a configuration of a performance information storage part;

FIG. 11 is a schematic view illustrating an example of a configuration of a replacement information storage part; and FIG. 12 is a schematic view illustrating an example of output of a proposal report.

DETAILED DESCRIPTION OF THE PREFERRED EMBODIMENTS

Figure 1:
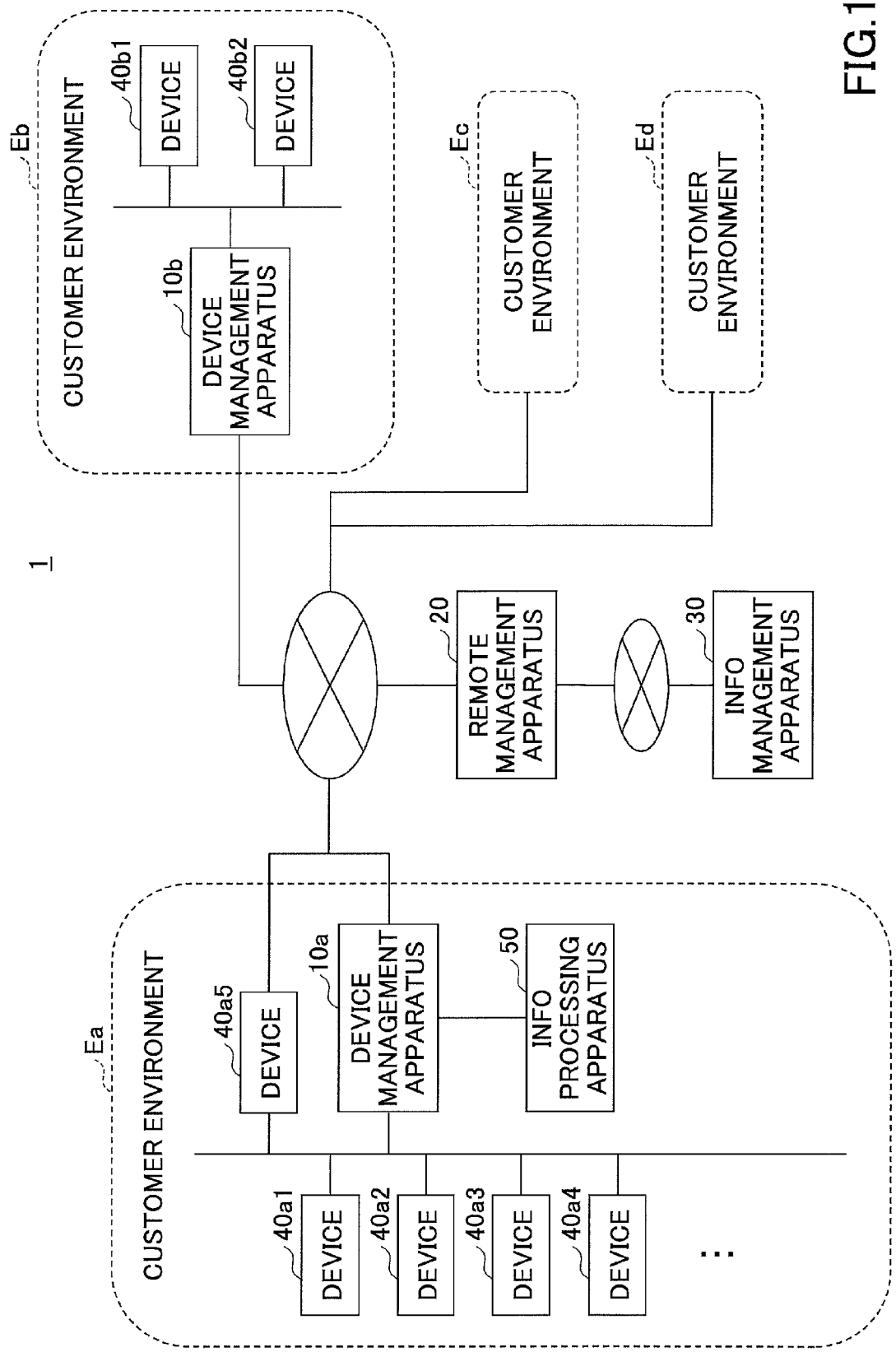
FIG. 1 is a schematic view illustrating an example of a network configuration of a device management system according to an embodiment of the present invention.

In the following, embodiments of the present invention will be described with reference to the drawings. FIG. 1 is a schematic view illustrating an example of a network configuration of a device management system 1 according to an embodiment of the present invention. In FIG. 1, the device management system 1 includes multiple customer environments E such as customer environments Ea-Ed, a remote management apparatus 20, and an information management apparatus 30.

Each of the customer environments E is a system environment for a customer of a manufacturer supplying devices 40, which includes a device management apparatus 10 and one or more of the devices 40. In the present embodiment, the customer environments E are system environments in mutually different companies for convenience's sake. However, an organization that uses a customer environment E is not limited to a company. A division or department in a company may use a customer environment E.

Each of the customer environments includes one or more devices 40 and a device management apparatus 10 if necessary. The device 40 is, for example, an image forming apparatus such as a multifunctional machine or a printer, a projector (image projection device), a PC (Personal Computer), a smart phone, or a tablet-type terminal. The device management apparatus 10 is a computer for collecting device information from the devices 40 in the same customer environment E, and for uploading the collected device information to the remote management apparatus 20. Namely, the device management apparatus 10 is connected with the devices 40 in the same customer environment E via a network such as a LAN (Local Area Network) or a WAN (Wide Area Network). Also, the device management apparatus 10 is connected with the remote management apparatus 20 via a network such as a WAN (Wide Area Network). However, there may be a device 40 that can directly communicate with the remote management apparatus 20 such as the device 40a5 in the customer environment Ea. Device information of such a device 40 may be uploaded to the remote management apparatus 20 without being intervened by the device management apparatus 10. Note that the device information is information that includes attribute information of a device 40, state information of the device 40, and setting information of the device 40.

In FIG. 1, an information processing apparatus 50 is connected with a device management apparatus 10a via a network such as a LAN in the customer environment Ea. The information processing apparatus 50 is a PC (Personal Computer), a tablet-type terminal, a smart phone, a cellular phone, or the like that is used for making a proposal of replacement of a device 40. The information processing apparatus 50 receives conditions for a proposal as input, and outputs report information that shows proposal content.

On the other hand, the remote management apparatus 20 and the information management apparatus 30 are operated by, for example, an organization (for example, the manufacturer of the devices 40) that is in charge of maintenance of the devices 40.

The remote management apparatus 20 is a computer for receiving device information that is uploaded from the device management apparatus 10 or the devices 40 in the multiple customer environments E in a unified way. Note that upload of device information is executed at a timing, for example, when a device configuration in a customer environment E is changed, or when the device information of any one of the devices 40 is changed. However, upload of device information may be executed at another timing, for example, at regular intervals.

The information management apparatus 30 manages the device information received by the remote management apparatus 20. Note that it is assumed in the present embodiment that device information is cached in the remote management apparatus 20 for a predetermined period, and the device information that needs to be maintained longer than the predetermined period is accumulated in the information management apparatus 30. Also, device information uploaded via a remote management apparatus 20 (not shown) connected with a customer environment E (not shown) may be accumulated in the information management apparatus 30. For example, if remote management devices 20 are installed in regions such as countries or the like, the device information from the customer environment E within one of the regions is uploaded to the corresponding remote management apparatus 20. The device information of multiple regions is accumulated in the information management apparatus 30.

Note that the remote management apparatus and the information management apparatus 30 are connected with each other via a network, for example, a LAN or a WAN. However, the remote management apparatus 20 and the information management apparatus may be implemented by a single computer. Also, the remote management apparatus 20 and the information management apparatus 30 may be constituted with multiple computers, respectively.

Figure 2:
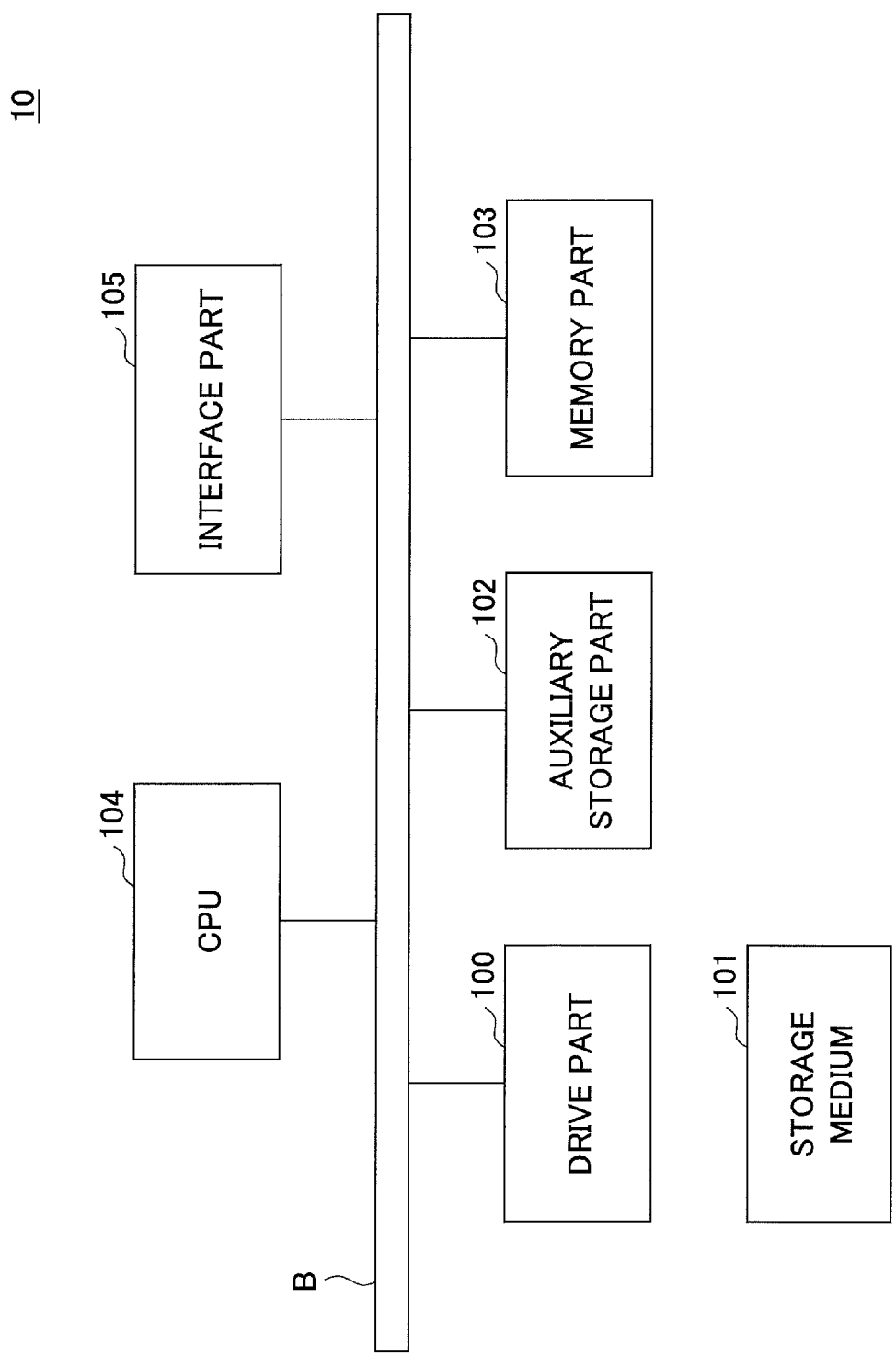
FIG. 2 is a schematic view illustrating an example of a hardware configuration of a device management apparatus according to an embodiment of the present invention.

FIG. 2 is a schematic view illustrating an example of a hardware configuration of the device management apparatus 10 according to the present embodiment of the present invention. The device management apparatus 10 in FIG. 2 includes a drive part 100, an auxiliary storage part 102, a memory part 103, a CPU 104, and an interface part 105 that are mutually connected via a bus B.

A program that performs processing on the device management apparatus 10 is provided with a storage medium 101. When the storage medium 101 storing the program is set in the drive part 100, the program is installed into the auxiliary storage part 102 from the storage medium 101 via the drive part 100. However, installation of the program is not necessarily executed by loading it from the storage medium 101, but by downloading it from another computer via a network. The auxiliary storage part 102 stores the installed program, and stores required files, data, and the like as well.

The memory part 103 reads the program from the auxiliary storage part 102 to store the program into it when receiving a start command for the program. The CPU 104 implements functions relating to the device management apparatus 10 by executing the program stored in the memory part 103. The interface part 105 is used as an interface for connecting with a network.

Note that the information processing apparatus 50, the remote management apparatus 20, and the information management apparatus 30 may have substantially the same hardware configuration as in FIG. 2, respectively. However, it is desirable for the information processing apparatus 50 to include input parts such as a keyboard and a mouse, and a display part such as an LCD display. Alternatively, the information processing apparatus 50 may include an electronic part that combines an input part and a display part such as a touch panel.

Figure 3:
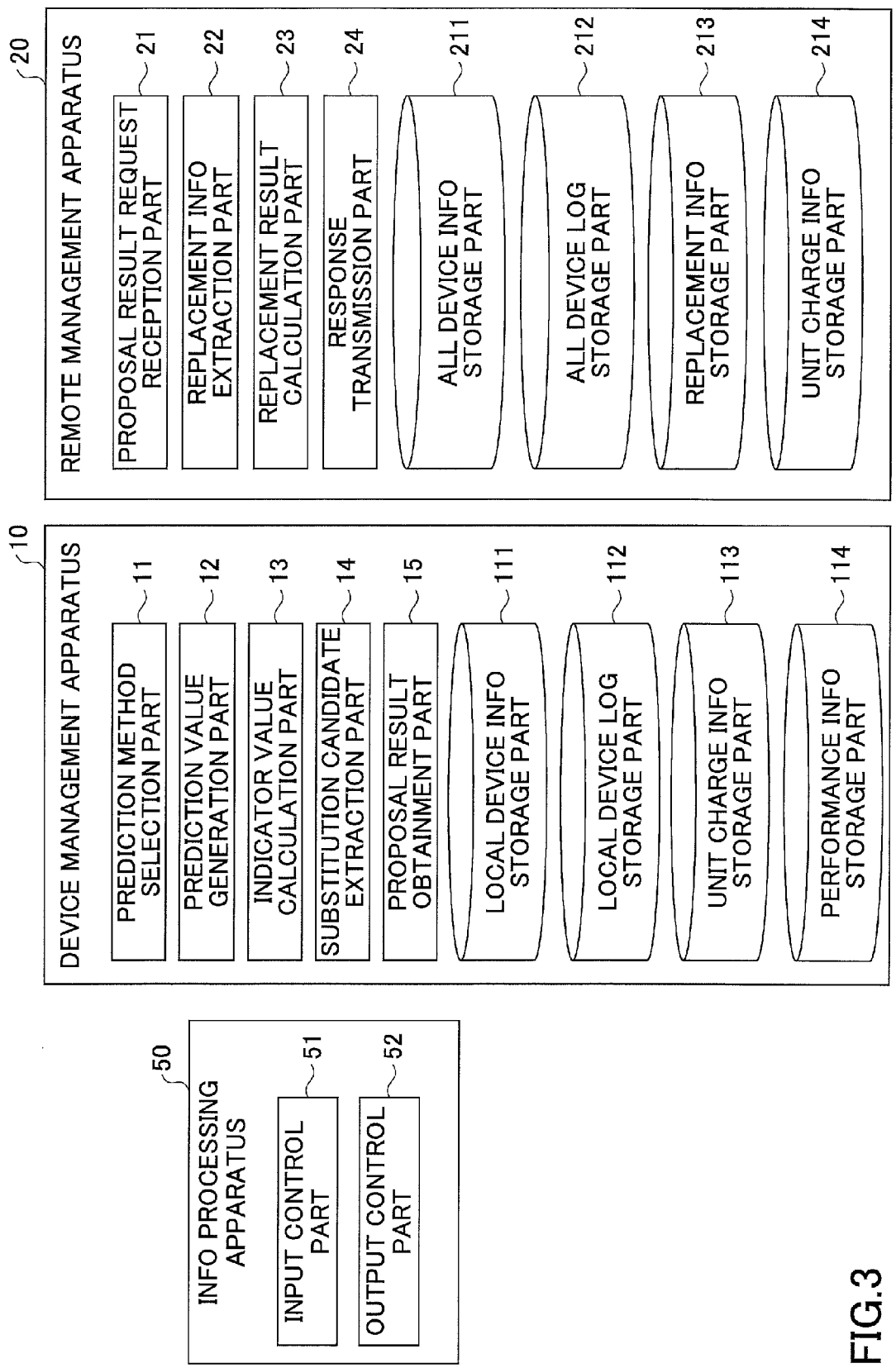
FIG. 3 is a schematic view illustrating an example of a functional configuration of a device management system according to an embodiment of the present invention.

FIG. 3 is a schematic view illustrating an example of a functional configuration of the device management system 1 according to the present embodiment of the present invention. In FIG. 3, the information processing apparatus 50 includes an input control part 51 and an output control part 52. These parts are implemented by procedures that a program installed in the information processing apparatus 50 has the CPU of the information processing apparatus execute. The input control part 51 executes a process for receiving input from an operator. The output control part 52 executes a process for outputting processed results or the like that depend on input to the display part.

The device management apparatus 10 includes a prediction method selection part 11, a prediction value generation part 12, an indicator value calculation part 13, a substitution candidate extraction part 14, and a proposal result obtainment part 15. These parts are implemented by procedures that a program installed in the device management apparatus 10 has the CPU 104 of the device management apparatus 10 execute. The device management apparatus 10 also utilizes a local device information storage part 111, a local device log storage part 112, a unit charge information storage part 113, and a performance information storage part 114. These storage parts may be implemented by the auxiliary storage part 102, or a storage device connected with the device management apparatus 10 via a network.

The prediction method selection part 11 selects a prediction method (prediction algorithm) of future operation amounts or workload ("operation amounts" will be used, hereafter) of a device 40, based on change of result values of operation amounts in the past of the device 40 and the like. The result values of the operation amounts of the device are stored in the local device log storage part 112 in a time series. Namely, the local device log storage part 112 stores a history of log information of jobs executed on each of the devices 40 in the customer environment E to which the device management apparatus 10 belongs, and a history of information that represents states of each of the devices 40 obtained from the device 40 periodically in a time series. The information that represents states of a device 40 includes values of various counters (counter values) included in the device 40. The counter is information that is increased on a job execution, which is provided, for example, for functions, or for each execution condition of the functions. Concrete examples include a counter of full color printing or a counter for monochrome printing for a print function. In the present embodiment, a counter value is an example of a value representing an operation amount.

The prediction value generation part 12 generates (calculates) prediction values of operation amounts during a predetermined period for a specific device 40 based on a prediction method selected by the prediction method selection part 11.

The indicator value calculation part 13 calculates indicator values used as reference for determining superiority or inferiority of a device 40 (called a "reference indicator values", hereafter) compared with other devices 40, based on result values or prediction values of operation amounts of the device 40. Examples of such an indicator (called a "reference indicator", hereafter) include a cost (cost), power consumption, and downtime. The downtime is time during which a device 40 cannot be used due to a fault or the like.

The substitution candidate extraction part 14 extracts combinations of devices (models) that are substitutional for a part of or all of the devices 40 that are currently used. When extracting a combination of substitutional devices, the reference indicator values of a substitutional device, the reference indicator values of the currently used device 40, and the like are taken into consideration.

The proposal result obtainment part 15 obtains result information of proposals in the past from the remote management apparatus 20 whose contents are equivalent or similar to the combinations extracted by the substitution candidate extraction part 14 with respect to replacing a specific device 40 with another device 40. Namely, the proposal result obtainment part 15 transmits an obtainment request for result information about such proposals to the remote management apparatus 20, and receives a response that includes the result information of proposals, which is returned in response to the request. The result information of a proposal is information about a replacement case that indicates improvement or the like of reference indicator values after replacement that has been taken place as proposed.

The local device information storage part 111 stores device information of the devices 40 in the customer environment E to which the device management apparatus 10 belongs. The unit charge information storage part 113 stores unit charges for operation amounts. The performance information storage part 114 stores information about performance for each function of each model of the devices 40.

The remote management apparatus 20 includes a proposal result request reception part 21, a replacement information extraction part 22, a replacement result calculation part 23, and a response transmission part 24. These parts are implemented by procedures that a program installed in the remote management apparatus 20 has a CPU of the remote management apparatus 20 execute. The remote management apparatus 20 also utilizes an all device information storage part 211, an all device log storage part 212, a replacement information storage part 213, and a unit charge information storage part 214. These storage parts may be implemented by an auxiliary storage part included in the remote management apparatus 20, or a storage device connected with the remote management apparatus 20 via a network.

The proposal result request reception part receives an obtainment request for result information of proposals from the proposal result obtainment part 15 of the device management apparatus 10. The replacement information extraction part 22 extracts result information about replacement of a device 40 (called "replacement information", hereafter) from the replacement information storage part 213, which is based on proposals in the past having contents equivalent or similar to the content specified in the obtainment request of result information of proposals.

The replacement information storage part 213 stores replacement information for each result of replacement cases of a device 40. The replacement information includes correspondence information between a device 40 before replacement and a device 40 after replacement, and information about proposal content with which actual replacement has been taken place.

The replacement result calculation part 23 calculates operation amounts, reference indicator values, and the like for a state before replacement relating to replacement information extracted by the replacement information extraction part 22 and for a state after replacement of the device 40, respectively. The response transmission part 24 replies with a response that includes calculation results by the replacement result calculation part 23.

The all device information storage part 211 stores device information stored in the local device information storage parts 111 across the multiple customer environments E. The all device log storage part 212 stores information stored in the local device log storage parts 112 across the multiple customer environment E. Information stored in the unit charge information storage part 214 is the same as that stored in the unit charge information storage part 113.

Note that positions of the parts are not necessarily limited to places illustrated in the example in FIG. 3. For example, the remote management apparatus 20 may have the function of the device management apparatus 10. In this case, the information processing apparatus 50 may be connected with the remote management apparatus 20. Also, the information management apparatus 30 may have the functions of the device management apparatus 10 and the remote management apparatus 20. In this case, the information processing apparatus 50 may be connected with the information management apparatus 30.

In the following, procedures executed by the device management system 1 will be described. Note that an example will be described where a proposal is made to the customer environment Ea for replacement of a device 40 in the present embodiment. However, the other customer environments E may be applied with the procedure in the present embodiment.

Figure 4:
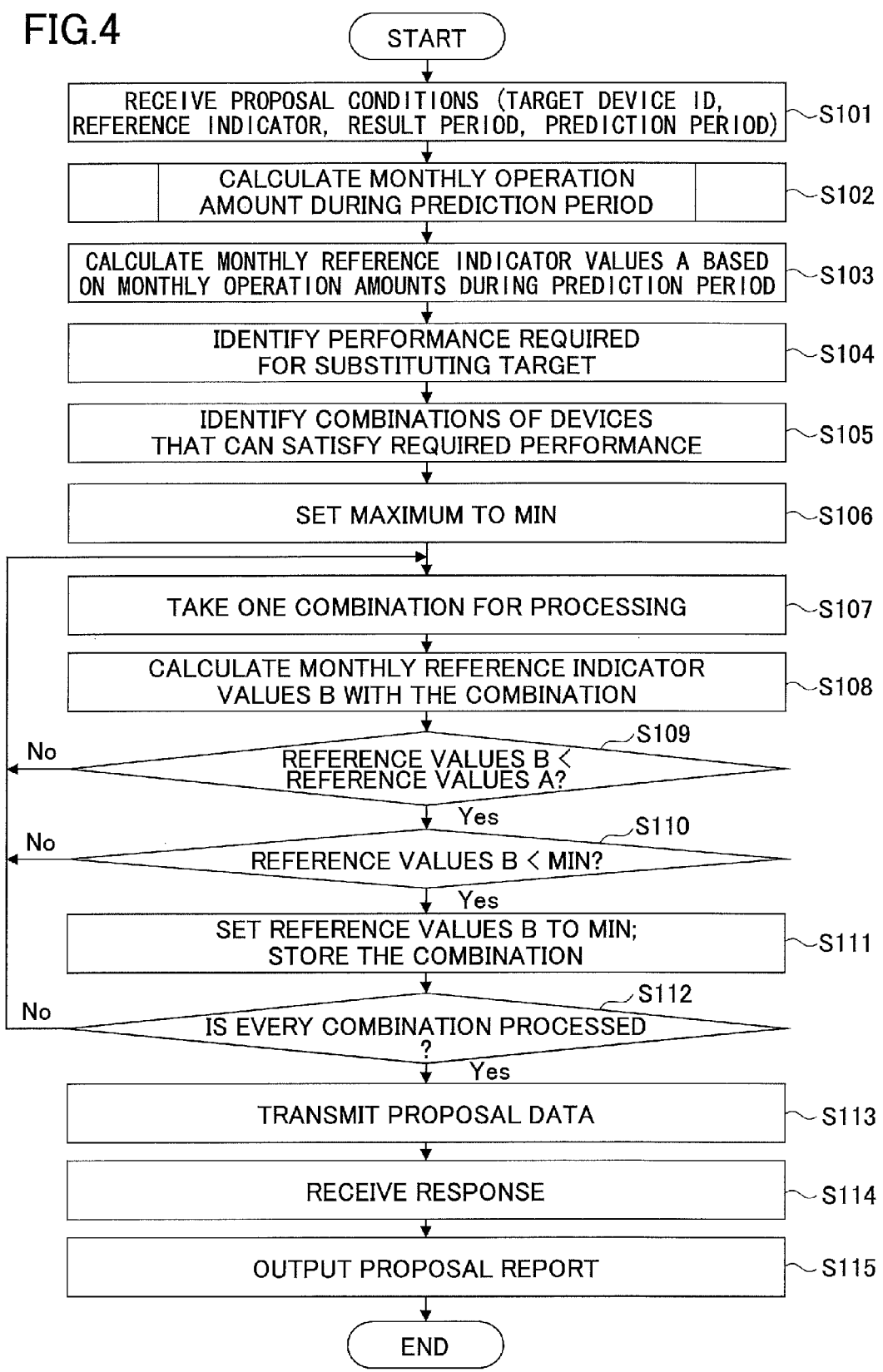
FIG. 4 is a flowchart illustrating an example of a procedure for a proposal process of replacement of a device.

FIG. 4 is a flowchart illustrating an example of a procedure for a proposal process of replacement of a device 40.

At Step S101, the input control part 51 of the information processing apparatus 50 receives proposal conditions as input from an operator. The operator is a person, for example, to propose replacement of a device 40 in the customer environment Ea. The proposal conditions include, for example, a target device ID, a reference indicator, a result period, and a prediction period. The target device ID is identification information of a device 40 to be replaced (called a "target device", hereafter) among devices 40 currently used in the customer environment Ea. In the present embodiment, identification information of each individual device 40 is called a "device ID". The target device ID is identified, for example, by selecting one or more records in the list of device information stored in the local device information storage part 111 of the device management apparatus 10a. Namely, the device information includes the device ID. Also, multiple devices 40 may be selected as the target devices.

The reference indicator is a reference indicator used for comparing the target device with a device 40 that can substitute the target device (called a "substitutional device", hereafter) to determine which is superior or inferior.

The result period is a period during which result values of operation amounts and reference indicator values of a target device in the past are obtained, which are taken into consideration for predicting operation amounts and reference indicator values of the target device in the future. The prediction period is a period during which prediction values of operation amounts and reference indicator values are calculated for the target device and the substitutional device, respectively. Namely, the prediction period is a period in the future.

Figure 5:
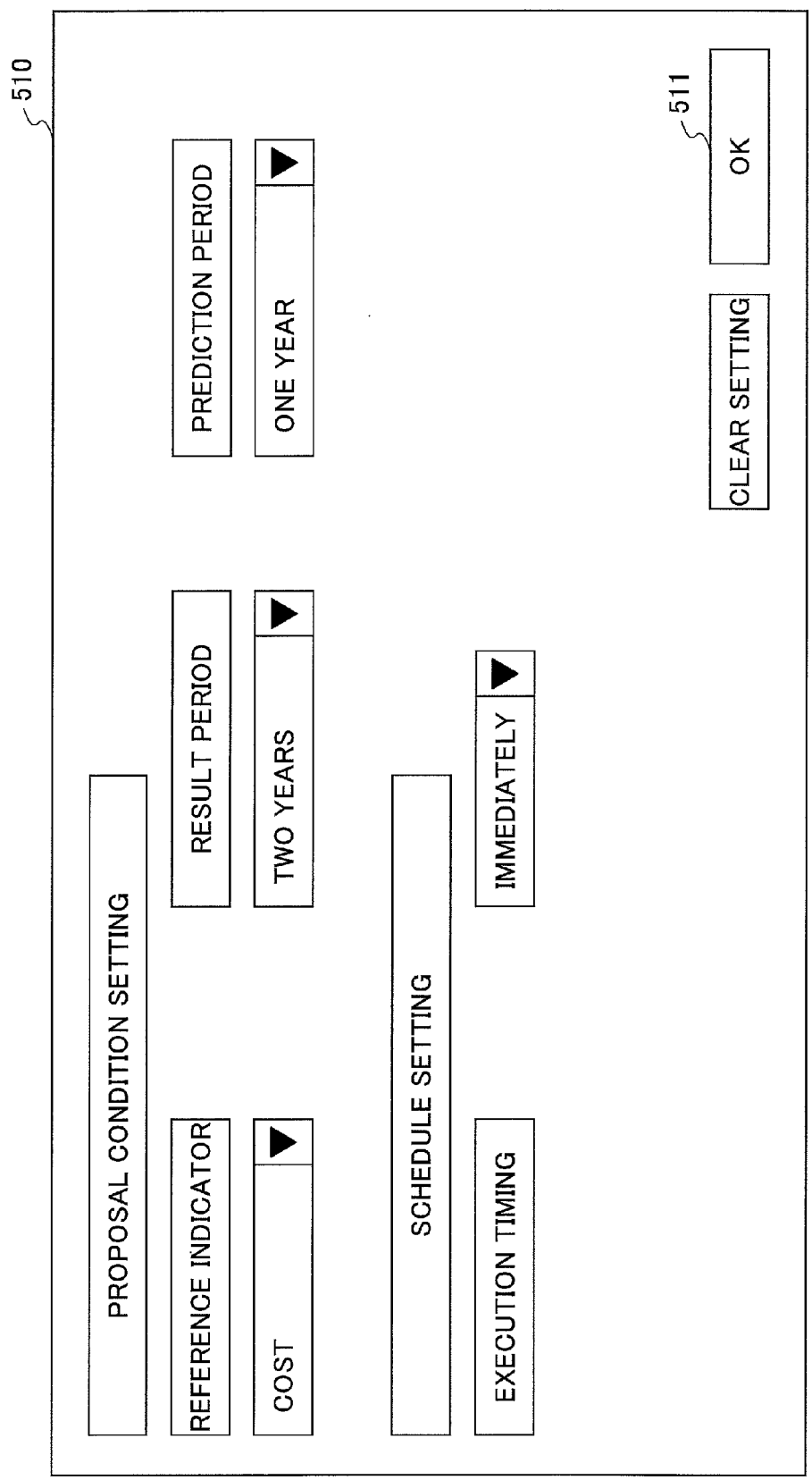
FIG. 5 is a schematic view illustrating a display example of a proposal condition input screen.

The reference indicator, the result period, and the prediction period may be input via a screen, for example, as illustrated in FIG. 5.

FIG. 5 is a schematic view illustrating a display example of a proposal condition input screen. On the proposal condition input screen 510 illustrated in FIG. 5, the reference indicator, the result period, and the prediction period can be entered or selected. FIG. 5 illustrates an example where "COST" is selected as the reference indicator, "TWO YEARS" is selected as the result period, and "ONE YEAR" is selected as the prediction period.

Schedule setting can also be specified in FIG. 5. The schedule setting can specify timing for executing Steps S102 and after (execution timing). FIG. 5 illustrates an example where "IMMEDIATELY" is selected as the timing. Therefore, in response to a push of an OK button 511, Steps S102 and after are executed immediately. If timing other than "IMMEDIATELY" such as a specific date and time is specified for the execution timing, Steps S102 and after are executed when the specified timing comes.

The proposal conditions input at Step S101 are transmitted to the device management apparatus 10a. Therefore, Steps S102 and after are executed by the device management apparatus 10a based on the proposal conditions. However, the information processing apparatus 50 may execute Steps S102 and after, using information stored in the device management information 10a.

At Step S102, the prediction value generation part 12 and the like of the device management apparatus 10a execute a calculation process of prediction values of monthly operation amounts during the prediction period for each of the target devices. Units of operation amounts may be different for types of the devices 40. For example, if it is a printer, the unit may be a value of a counter that is counted up in the device according to printing. Also, if it is a projector, the unit may be projection time of images. Also, if a target device includes multiple functions (scanning, printing, FAX, copying, etc.), such as a multifunctional machine, counter values are calculated for respective functions. Note that Step S102 will be described in detail below.

Next, the indicator value calculation part calculates monthly reference indicator values (namely, costs) during the prediction period based on the calculation result of the prediction values of monthly operation amounts during the prediction period for each of the target devices (Step S103). Calculation of the costs based on the counter values is executed using, for example, the unit charge information storage part 113.

FIG. 6 is a schematic view illustrating an example of a configuration of the unit charge information storage part 113. In FIG. 6, the unit charge information storage part 113 stores a unit charge of a function of a model for each combination of the model and the function. In FIG. 6, for each function of a model whose operation amount is measured by a counter value, a unit charge (Japanese Yen) per count is stored for each execution condition (full color or monochrome). Also, for a model whose operation amount is measured by time, a unit charge (Japanese Yen) per hour is stored.

Therefore, at Step S103, a monthly cost is calculated by multiplying a monthly operation amount, which has been calculated at Step S102, by the unit charge stored in the unit charge information storage part 113 that is associated with the model of the target device. Note that if there are multiple target devices 40, monthly total costs of the multiple target devices 40 are calculated. In the following, the cost calculated at Step S103 will be referred to as the "monthly total cost A".

Next, the substitution candidate extraction part 14 identifies performance required for substituting the target device (for example, an operation amount per unit time) (Step S104). Namely, the performance that should be satisfied with a substitutional device is identified. A representation format of performance may be function-specific. Therefore, performance may be identified for each of the functions. For example, for a print function, the performance is represented by ppm (Page Per Minute). Therefore, required ppm for a substitutional device (called "required ppm", hereafter) may be calculated based on the following formula (1).

$$\text{required ppm} = (\text{total of monthly average counter values of the target devices})/(20 \times 7 \times 60 \times 4\%) \tag{1}$$

In the formula (1), the average counter values of the target devices 40 is an average of monthly counter values of prediction values calculated for the target devices, respectively, at Step S102. For example, if there are two target devices, a target device "a" and a target device "b", then, the average value of monthly counter values is calculated for each of the target device "a" and the target device "b", and then, the total of the average value of the target device "a" and the average value of the target device "b" is calculated.

The number 20 in the formula (1) is the number of days in a month when the target device is used (for example, working days per month). The number 7 is working hours per day. 4% is an average operation rate of the target device. The average operation rate can be calculated based on operation time per count and an average of monthly counter values.

Note that, for performance of the other functions, values required for a substitutional device may be calculated in substantially the same way, namely, based on an operation amount required for unit time. In the following, required performance for a substitutional device will be referred to as "required performance".

Next, the substitution candidate extraction part 14 identifies one or more combinations of one or more substitution candidate models (called "substitution candidate models", hereafter) that satisfy the required performance (Step S105). The combinations are obtained by referring to, for example, the performance information storage part 114.

FIG. 7 is a schematic view illustrating an example of a configuration of the performance information storage part 114. In FIG. 7, the performance information storage part 114 stores performance, a substitutional function, a substitution performance conversion formula, and the like for each combination of a model and a function. The performance is, for example, a value that represents a doable operation amount per unit time, for example, a ppm value for a print function (Print). The substitutional function is a function than can substitute a function specified in the field of "FUNCTION". FIG. 7 illustrates an example where "Display" is set as a substitutional function for "Print". Namely, it states that a print function can be substituted by a display function. The substitution performance conversion formula is used when substituting a function with a substitutional function, which is a formula that converts a performance value of the substitutional function to a performance value of the function to be substituted.

At Step S105, all combinations of substitution candidate models are identified that can satisfy performance of all functions of the target devices. For example, if the total of performance of print functions of the target devices is 80 ppm, for example, a combination may be identified that includes a printer with 45 ppm, a projector whose performance is converted to 25 ppm, and a printer with 15 ppm. Note that the total of performance of target devices may not be completely equivalent to the total of performance of substitution candidate models included in a combination. The latter is just required to satisfy the former.

Next, the substitution candidate extraction part 14 sets a maximum value to a variable MIN (Step S106). The variable MIN is a variable that is used at later steps. Next, the substitution candidate extraction part 14 takes one combination to be processed among the combinations identified at Step S105 (Step S107). The combination to be processed will be referred to as the "target combination".

Next, the substitution candidate extraction part 14 calculates a total of monthly reference indicator values (costs) during a prediction period for substitution candidate models in the target combination (Step S108). The costs are calculated assuming that the substitutional candidate models work for as much as the predicted operation amounts during the prediction period of the target device, which have been calculated at Step S102. As for the unit charge for the operation amounts, a unit charge for each of the substitution candidate models is used, which is stored in the unit charge information storage part 113. In the following, the cost calculated for a month at Step S108 will be referred to as the "monthly total cost B".

Next, the substitution candidate extraction part 14 determines whether the total of monthly total costs B during the prediction period is less than the total of the monthly total costs A during the prediction period (Step S109). Namely, it is determined whether the substitutional devices have a lower cost than the target device. If the total of monthly total costs B during the prediction period is smaller (Yes at Step S109), the substitution candidate extraction part 14 determines whether monthly total costs B during the prediction period is less than the value of the variable MIN (Step S110). If the total of monthly total cost B during the prediction period is smaller (Yes at Step S110), the substitution candidate extraction part 14 sets the total of monthly total costs B during the prediction period to the variable MIN. Also, the substitution candidate extraction part 14 stores the models included in the target combination as a proposal target (Step S111). Also, monthly reference indicator values and the like calculated for the target combination during the prediction period may be stored. If there has been a combination stored as the proposal target, the stored combination is overwritten by the target combination.

After Steps S107-S111 are executed for every combination identified at Step S105 (Yes at Step S112), the proposal result obtainment part 15 transmits proposal data to the remote management apparatus 20 (Step S113). The proposal data includes information that represents proposal content such as the model of the target device, models included in the combination stored as the proposal target (called "proposal models", hereafter) at timing when executing Step S113, the reference indicator, and the prediction period.

Next, the proposal result obtainment part receives a response from the remote management apparatus 20 that includes result information of proposals whose proposal contents are substantially the same as the proposal data (Step S114). The result information of proposals is transmitted to the information processing apparatus 50 with the proposal content including the proposal data (the proposal content in the current case). The output control part 52 of the information processing apparatus 50 outputs (displays) the proposal content in the current case, the result information of proposals, and the like (Step S115). The proposal content in the current case may include not only proposal models, but also monthly reference indicator values calculated for the proposal models during the prediction period.

Note that although the example in FIG. 4 is described with a process where combinations of proposal models are narrowed down to one combination, priorities may be assigned to the combinations based on reference indicator values. In this case, proposal data relating to all of the combinations may be transmitted to the remote management apparatus 20 at S113.

Also, although a smaller total of monthly reference indicator values during a prediction period is selected as a proposal target at Step S109 or S110 in the example, if another reference indicator is adopted that is determined as superior with a greater value, a proposal target having a greater value may be selected.

Figure 8:
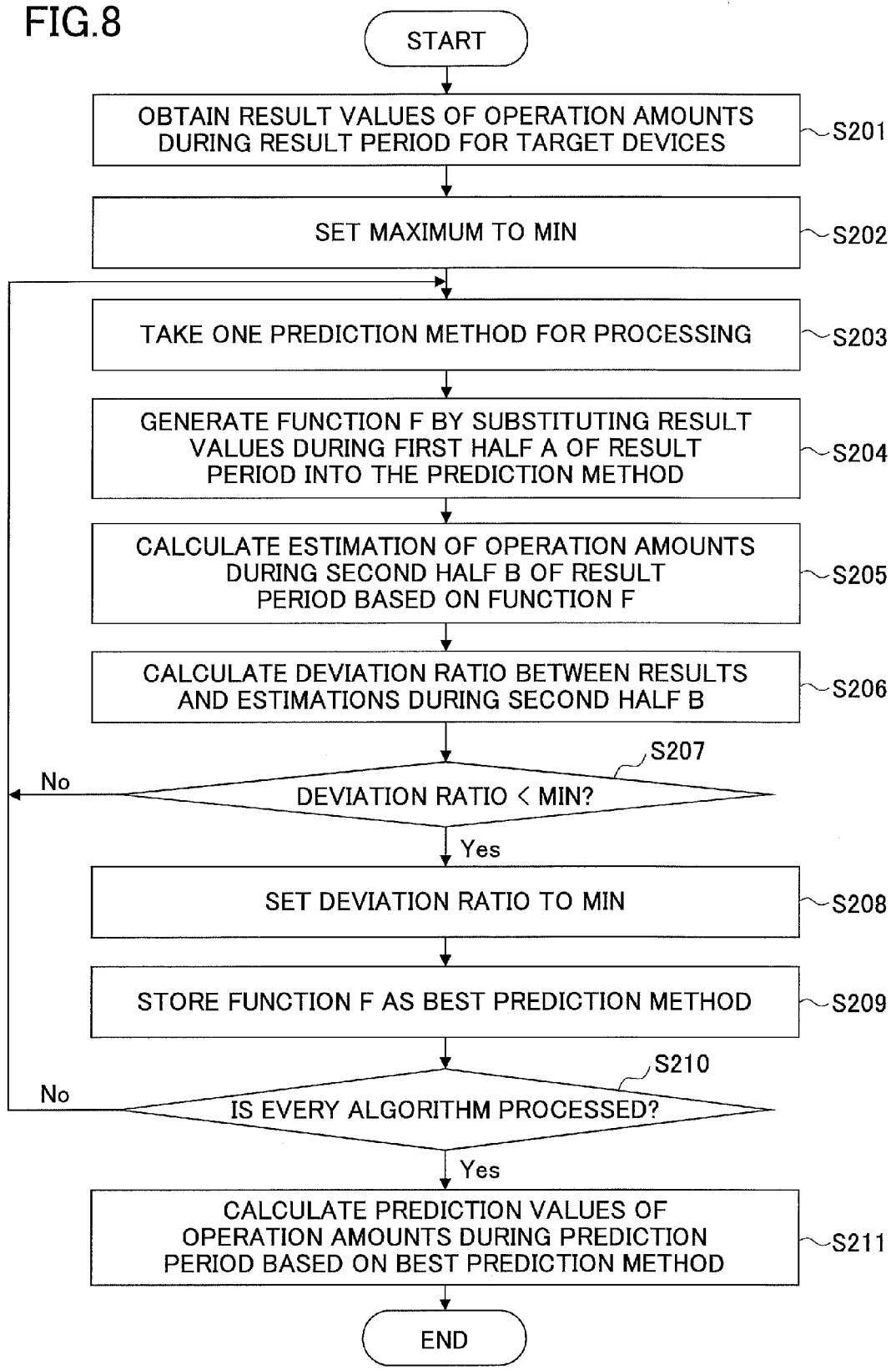
FIG. 8 is a flowchart illustrating an example of a procedure for a calculation process of monthly operation amounts of a target device during a prediction period.

Next, Step S102 will be described in detail. FIG. 8 is a flowchart illustrating an example of a procedure for a calculation process of monthly operation amounts of a target device during a prediction period. Note that one target device is assumed to be processed in the description of FIG. 8 for convenience's sake. Therefore, if there are multiple target devices, the process in FIG. 8 may be repeated for the number of the target devices.

At Step S201, the prediction method selection part 11 obtains result values of operation amounts of the target device during the result period, for example, from the local device log storage part 112.

Figure 9:
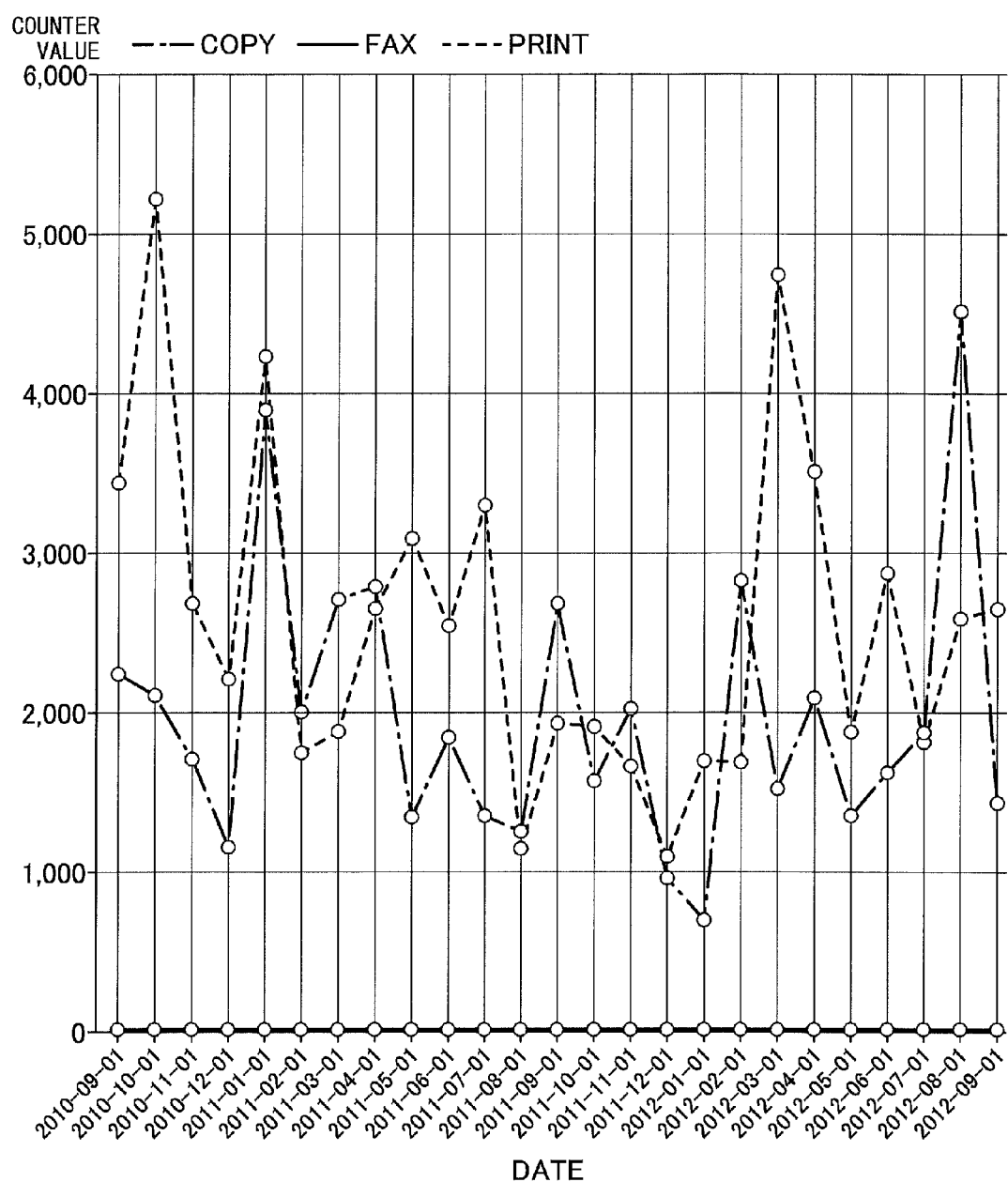
FIG. 9 is a schematic view illustrating result values of operation amounts of a target device.

FIG. 9 is a schematic view illustrating result values of operation amounts of a target device. In FIG. 9, change of monthly counter values for past two years is illustrated for each function of the target device. FIG. 9 illustrates an example where the result period is from Sep. 1, 2010 to Sep. 1, 2012. Although FIG. 9 illustrates the change of operation amounts (counter values) by graphs for convenience's sake, the local device log storage part 112 stores data from which information illustrated in FIG. 9 can be extracted. Note that the example in FIG. 9 assumes that counter values are initialized to 0, for example, at the end of a month. Namely, a counter value illustrated in FIG. 9 is a value that indicates an operation amount for a month. If a counter value continues to increase without the initialization, an operation amount for a month may be obtained by calculating a difference between a counter value at the start of the month and a counter value at the end of the month. Also, FIG. 9 illustrates the example where the target device has three functions, which are copying, FAX, and printing. Therefore, changes of the counter values for the three functions are illustrated. For a target device having multiple function as above, Steps S202 and after are executed for each of the functions.

Next, the prediction method selection part 11 sets a maximum value to a variable MIN (Step S202). The variable MIN is a variable used at later steps. Next, the prediction method selection part 11 takes one of multiple prediction methods (prediction algorithms) provided beforehand as the method to be processed (Step S203). Examples of prediction methods include a Holt-Winner prediction method, a Grey prediction method, and a prediction method based on an approximate curve. An original prediction method may also be included as an alternative. In the following, the prediction method taken to be processed will be referred to as the "target prediction method".

Next, the prediction method selection part generates a function F by substituting result values during a first half A of the result period (Sep. 1, 2010 to Sep. 1, 2012) into the target prediction method (Step S204). The first half A may be calculated, for example, by subtracting a prediction period from the result period if the result period (two years) is longer than the prediction period (one year) as in the present embodiment. Namely, in this case, the first half of the result period, or one year (Sep. 1, 2010 to Aug. 31, 2011), is taken as the first half A. Note that the function F, which is generated by substituting the operation amounts of the first half A into the target prediction method, is a function that reflects a tendency of change of the operation amounts in the first half A.

Next, the prediction method selection part calculates estimation values of operation amounts of the target device during the second half B of the result period based on the function F (Step S205). For example, the function F is a function that receives dates as input and outputs counter values. Therefore, monthly counter values are obtained for the second half B at Step S205. The second half B is a period that excludes the first half A from the result period. Note that calculation results at Step S205 are called "estimation values" not to be confused with prediction values in the prediction period for convenience' sake.

Next, the prediction method selection part calculates an average of deviation ratios between monthly result values and estimation values during the second half B (Step S206). A deviation ratio of a month is calculated by, for example, the following formula (2).

$$\text{deviation ratio} = |\text{result value} - \text{estimation value}|/\text{result value} \quad (2)$$

The average value of deviation ratios is an average value of all deviation ratios which are calculated by the formula (2) for the months during the second half B, respectively. Note that an absolute value (|result value−estimation value|) of a deviation may be calculated instead of the deviation ratio.

Note that the deviation ratio is a value used for determining validity of prediction of an operation amount of the target device using the function F based on the target prediction method. Namely, it is based on a notion that validity of prediction using the function F can be considered as higher if the estimation value is closer to the result value.

Next, the prediction method selection part 11 determines whether the average value of the deviation ratios is less than the value of the variable MIN (Step S207). If the average value of the deviation ratios is smaller (Yes at Step S207), the prediction method selection part 11 sets the average value of the deviation ratios to the variable MIN (Step S208). Next, the prediction method selection part 11 stores the function F as a best prediction method (Step S209). Note that, if there is another function that has already been stored as a best prediction method, it is overwritten by the function F.

After Steps S203 and after are executed for every prediction method provided beforehand (Yes at Step S210), the prediction value generation part 12 calculates prediction values of operation amounts during the prediction period of the target device based on a function stored as a best prediction method at the moment (Step S211). Namely, the prediction method is picked up among multiple prediction methods, which is most suitable for following change or tendency of the result values of the operation amounts of the target device to calculate prediction values during the prediction period. Therefore, it can be expected that prediction values are derived with higher accuracy than in a case where a single fixed prediction method is used.

Next, a procedure will be described that is executed by the remote management apparatus 20 in response to receiving proposal data transmitted from the device management apparatus 10a at Step S113 in FIG. 4.

Figure 10:
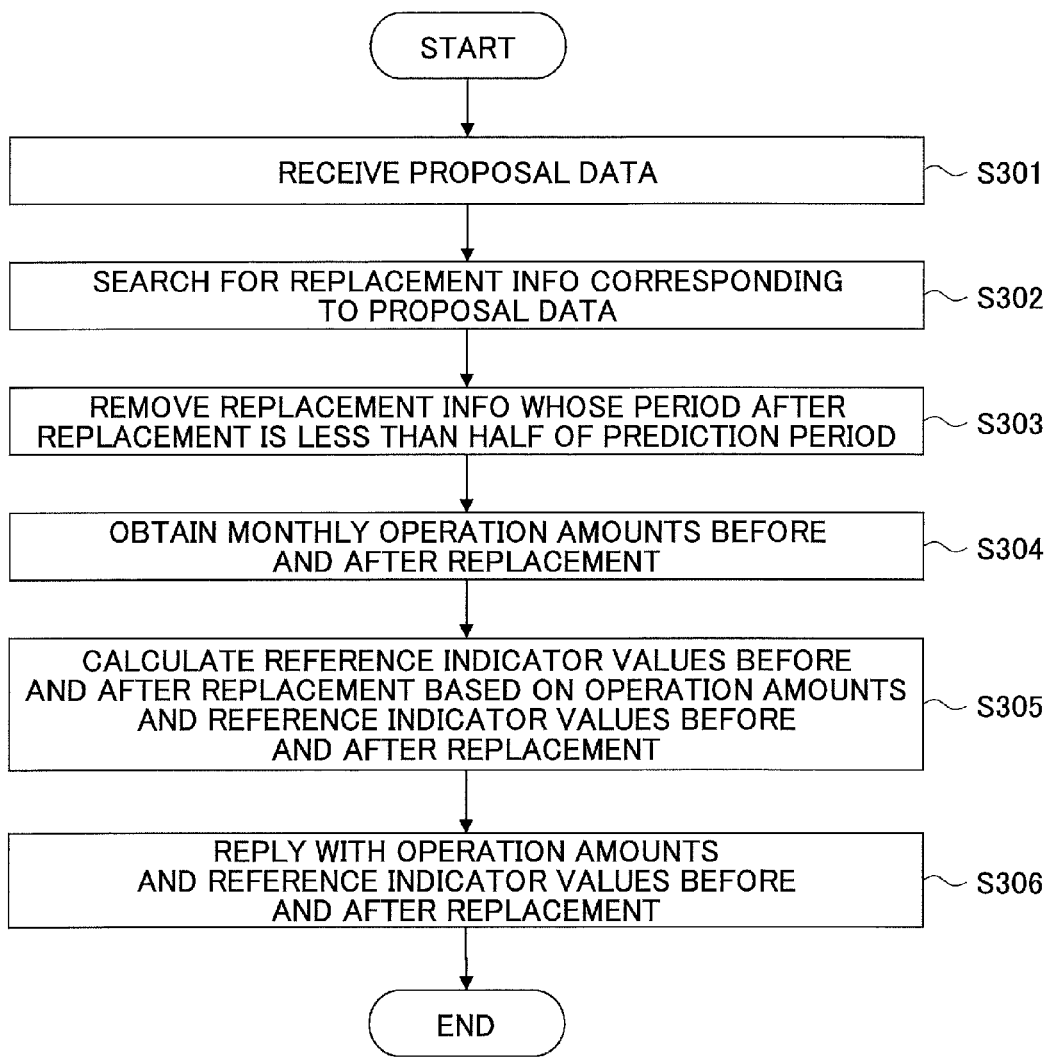
FIG. 10 is a flowchart illustrating an example of a procedure for a generation process of result information based on a proposal in the past that has content similar to that of a current proposal.

FIG. 10 is a flowchart illustrating an example of a procedure for a generation process of result information based on proposals in the past that have contents similar to that of a current proposal.

At Step S301, the remote management apparatus 20 and the proposal result request reception part 21 receive proposal data transmitted form the device management apparatus 10a. The proposal data includes information that represents proposal content such as the model of the target device, proposal models, the reference indicator, and the prediction period.

Next, the replacement information extraction part 22 searches for replacement information that corresponds to the proposal data in the replacement information storage part 213 (Step S302).

FIG. 11 is a schematic view illustrating an example of a configuration of the replacement information storage part 213. As illustrated in FIG. 11, the replacement information storage part 213 stores replacement information that includes proposals and their respective contents about replacement, with which devices 40 have been actually replaced. A record of replacement information includes a reference indicator, a model before replacement, a device ID before replacement, a model after replacement, a device ID after replacement, a replacement date, a customer ID, and a prediction period. Among these, the reference indicator and the prediction period are a reference indicator and a prediction period that have been input as proposal conditions at Step S101 in the proposal procedure for the replacement. Also, the model before replacement and the device ID before replacement are a model and a device ID of the target device in the proposal conditions. The model after replacement is a proposal model that is obtained by executing the procedure in FIG. 4. The device ID after replacement is a device ID of the device 40 after replacement. The replacement date is a date when replacement is executed. The customer ID is identification information of a customer (customer environment E) for whom proposal and replacement are considered. The remote management apparatus 20 manages information about multiple customer environments E, which includes replacement information for the multiple customer environments E (customers).

At Step S302, replacement information is searched for that is completely equivalent to the received proposal data in terms of the model of the target device, the proposal model, the reference indicator, the prediction period. Namely, replacement information in the past is searched for that relates to a proposal completely equivalent to that of the proposal in the current case. However, if equivalent replacement information is not found, search conditions may be relaxed. For example, prediction periods may be compared allowing a difference within three months to be determined as equivalent. Also, models may be compared based on a correspondence table provided separately that allows a match between analogous models to be determined as equivalent. Further, if a wider range of replacement information is stored in the information management apparatus 30, search may be executed in the replacement information stored in the information management apparatus 30. A "wider range" means a range that includes regions outside of the region managed by the remote management apparatus 20.

Note that it is desirable that replacement information to be searched is replacement information of a customer other than the customer (customer environment Ea) who owns the device management apparatus 10a that transmits the proposal data. This is because a proposal based on replacement information of other customers may make the proposal more persuasive. Therefore, the proposal data may include the customer ID of the customer environment Ea to which the device management apparatus 10a belongs as the transmission source. A search condition may be added to obtain replacement information that includes a customer ID other than the customer ID.

Next, the replacement information extraction part 22 removes a part of replacement information from one or more searched records of replacement information for records that have the period after replacement execution shorter than half of the prediction period (Step S303). This is because if the period after replacement execution is short, its reliability as result information is not necessarily high. Note that a period after replacement execution is a period starting from a replacement date included in the replacement information to a current day. Also, half of the prediction period is an example of a reference period to determine whether the period after replacement execution is long enough. For example, instead of half of the prediction period, an absolute value (for example, six months) may be used for determining whether the period after replacement execution is long enough.

Also, if all search-found records of the replacement information are turned out to be removed at Step S303, actual removal may not be executed. A part of the replacement information may be removed in order of time of replacement dates so that newer ones are removed.

Steps S304 and after are executed for remaining records of the replacement information. At Step S304, the replacement result calculation part 23 obtains monthly operation amounts before and after replacement, respectively, based on the customer ID, the device ID before replacement, and the device ID after replacement included in the replacement information, from the all device log storage part 212. Namely, the operation amounts before replacement are obtained based on information stored in the all device log storage part 212 for the customer ID and the device ID before replacement. The operation amounts after replacement are obtained based on information stored in the all device log storage part 212 for the customer ID and the device ID after replacement. The information that represents the obtained operation amounts is that as illustrated in FIG. 9, for example. Note that a period to be obtained for after replacement may be a period from the replacement date to the current day, and a period for before replacement may have the same length as the period.

Next, the replacement result calculation part 23 calculates monthly reference indicator values (costs) after replacement and monthly reference indicator values (costs) before replacement, based on monthly operation amounts before replacement, monthly operation amounts after replacement, and the unit charge information storage part 214 (Step S305). Note that the content stored in the unit charge information storage part 214 is the same as that stored in the unit charge information storage part 113. Also, the calculation method of a cost based on an operation amount is as described above.

Next, the response transmission part 24 replies to the device management apparatus 10a with a response that includes the monthly operation amounts and the reference indicator values (costs) before and after replacement, respectively (Step S306).

Therefore, at Step S115 in FIG. 4, the proposal content in the current case (target device, proposal models, etc.) is output along with result information of other customers who have adopted substantially the same proposals as the proposal in the current case. Namely, it is possible to present a basis on which the proposal in the current case can be shown beneficial for the customer, based on the actual results. Therefore, it is possible to raise persuasiveness of the proposal in the current case.

Also, graphs illustrated in FIG. 12 may be output at Step S115.

FIG. 12 is a schematic view illustrating an example of output of a proposal report. In FIG. 12, the horizontal axis represents time (date), and the vertical axis represents counter value (operation amount).

A graph g1 illustrates result values of operation amounts of a target device during a result period. A graph g2 illustrates prediction values of operation amounts of a proposal device during a prediction period. A graph g3 illustrates a lowest value of operation amounts described as preferable in the specification of the target device. A graph g4 illustrates a maximum value of operation amounts described as preferable in the specification of the target device. A graph g5 illustrates a lowest value of operation amounts described as preferable in the specification of the proposal device. A graph g6 illustrates a maximum value of operation amounts described as preferable in the specification of the proposal device.

For example, by comparing the graph g1 with the graphs g3 and g4, it can be understood that the target device has excessive performance in the customer environment Ea. On the other hand, by comparing the graph g2 with the graphs g5 and g6, it can be understood that the proposal device can be used within a range of the preferable operation amounts if adopted in the customer environment Ea. Namely, it can be understood that the proposal device is suitable for usage in the customer environment Ea.

Note that the device management system 1 is an example of an information processing system according to the present embodiment. The local device log storage part 112 is an example of a first result storage part. The prediction value generation part 12 is an example of a prediction part. The indicator value calculation part 13 is an example of a calculation part. The substitution candidate extraction part 14 is an example of an extraction part. The replacement result calculation part 23 is an example of an obtainment part. The output control part 52 is an example of an output part. The all device log storage part 212 is an example of a second result storage part.

Further, the present invention is not limited to the specific embodiments described herein, and variations and modifications may be made without departing from the spirit and scope of the present invention.

The present application is based on and claims the benefit of priority of Japanese Priority Patent Application No. 2013-049215, filed on Mar. 12, 2013, and Japanese Priority Patent Application No. 2013-234744, filed on Nov. 13, 2013, the entire contents of which are hereby incorporated herein by reference.

What is claimed is:

1. An information processing system comprising:
a first management apparatus including a first processor and a first storage;
a second management apparatus including a second processor and a second storage; and
an information processing apparatus, including a third processor and a display device, and communicable with at least one of the first management apparatus and the second management apparatus,
wherein the first storage stores result values of operation amounts of a first device that is connectable to the first management apparatus;
wherein the first processor performs a process including
generating prediction values of operation amounts of the first device during a predetermined period based on a change of the result values stored in the first storage;
calculating predetermined indicator values based on the prediction values and information related to the first device; and
extracting a second device from one or more substitutional devices for the first device, based on comparing predetermined indicator values calculated for the one or more substitutional devices based on the prediction values of the operation amounts with the predetermined indicator values for the first device,
wherein the second storage stores correspondence information indicative of a correspondence between a device before replacement and a device after replacement for each of results of replacements,
wherein the second processor performs a process including
obtaining operation amounts of the device before replacement and after replacement, respectively, according to the correspondence information of a replacement of the first device by the second device, from the second storage storing result values of operation amounts for each of the devices, and
wherein the third processor performs a process including
displaying information on the display device based on the operation amounts obtained by the obtaining of the second processor.

2. The information processing system as claimed in claim 1, wherein the generating of the first processor includes
based on the result values of the operation amounts of the first device during a first period, generating estimation values of operation amounts during a second period using a plurality of prediction methods, respectively, and
comparing the result values stored in the first storage for the second period with the estimation values, to select one of the plurality of prediction methods to be used for generating the prediction values from amongst the plurality of prediction methods.

3. The information processing system as claimed in claim 1, wherein the obtaining of the second processor obtains operation amounts of the device before replacement and the device after replacement, respectively, related to the correspondence information of the replacement associated with a customer different from a customer of the first device, from the second storage.

4. The information processing system as claimed in claim 1, wherein the extracting of the first processor extracts a device as the second device based on the result values of the operation amounts of the first device so that the extracted device has a capability satisfying an operation amount required per unit time.

5. An information processing method for an information processing system including a first management apparatus, a second management apparatus, and an information processing apparatus communicable with at least one of the first management apparatus and the second management apparatus, comprising:
generating, by a first processor of the first management apparatus, prediction values of operation amounts of a first device during a predetermined period based on a change of result values of operation amounts of the first device that is connectable to the first management apparatus and are stored in a first storage of the first management apparatus;
calculating, by the first processor of the first management apparatus, predetermined indicator values based on the prediction values and information related to the first device;
extracting, by the first processor of the first management apparatus, a second device from one or more substitutional devices for the first device, based on comparing predetermined indicator values calculated for the one or more substitutional devices based on the prediction values of the operation amounts with the predetermined indicator values for the first device;
storing, by a second processor of the second management apparatus, correspondence information indicative of a correspondence between a device before replacement and a device after replacement for each of results of replacements in a second storage of the second management apparatus;
obtaining, by the second processor of the second management apparatus, operation amounts of the device before replacement and after replacement, respectively, according to the correspondence information of a replacement of the first device by the second device, from the second storage storing result values of operation amounts for each of the devices; and
displaying, by a third processor of the information processing apparatus, information on a display device based on the operation amounts obtained by the obtaining.

6. The information processing method as claimed in claim 5, wherein the generating includes
based on the result values of the operation amounts of the first device during a first period, generating estimation values of operation amounts during a second period using a plurality of prediction methods, respectively, and
comparing the result values stored in the first storage for the second period with the estimation values, to select one of the plurality of prediction methods to be used for generating the prediction values from amongst the plurality of prediction methods.

7. The information processing method as claimed in claim 5, wherein the obtaining obtains operation amounts of the device before replacement and the device after replacement, respectively, related to the correspondence information of the replacement associated with a customer different from a customer of the first device, from the second storage.

8. The information processing method as claimed in claim 5, wherein the extracting extracts a device as the second device based on the result values of the operation amounts of the first device so that the extracted device has a capability satisfying an operation amount required per unit time.

9. The information processing system as claimed in claim 1, wherein the first management apparatus and the first device are provided within a first customer environment, and the second management apparatus is accessible from another first management apparatus provided within one or a plurality of second customer environments other than the first customer environment.

10. The information processing system as claimed in claim 1, wherein the information processing apparatus includes an input device from which conditions, including at least a device ID identifying the first device, are input to the information processing apparatus.

11. The information processing system as claimed in claim 1, wherein the displaying displays information on the display device based on the operation amounts of the first device before replacement and the operation amounts after replacement of the first device by the second device.

12. The information processing method as claimed in claim 5, wherein the first management apparatus and the first device are provided within a first customer environment, and the second management apparatus is accessible from another first management apparatus provided within one or a plurality of second customer environments other than the first customer environment.

13. The information processing method as claimed in claim 5, further comprising:
inputting, to the information processing apparatus, conditions, including at least a device ID identifying the first device, from an input device of the information processing apparatus.

14. The information processing method as claimed in claim 5, wherein the displaying, by the information processing apparatus, displays information on the display device based on the operation amounts of the first device before replacement and the operation amounts after replacement of the first device by the second device.

* * * * *